US006915132B2

(12) United States Patent
Chatterjee et al.

(10) Patent No.: US 6,915,132 B2
(45) Date of Patent: *Jul. 5, 2005

(54) SYSTEM AND METHOD FOR AUTOMATIC REGISTRATION NOTIFICATION FOR OVER-THE-AIR ACTIVATION

(75) Inventors: Arun K. Chatterjee, Redmond, WA (US); Brian Kevin Daly, Redmond, WA (US); David William James Holmes, Redmond, WA (US); Ileana A. Leuca, Bellevue, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 313 days.

This patent is subject to a terminal disclaimer.

(21) Appl. No.: 09/896,481

(22) Filed: Jun. 29, 2001

(65) Prior Publication Data

US 2002/0037724 A1 Mar. 28, 2002

Related U.S. Application Data

(63) Continuation of application No. 09/702,163, filed on Oct. 30, 2000, now Pat. No. 6,282,421.

(51) Int. Cl.[7] .............................................. H04Q 7/20
(52) U.S. Cl. ..................... 455/435.1; 455/445; 455/560
(58) Field of Search ................. 455/418–419, 455/551, 432, 445, 560, 435, 435.1; 379/91.01, 387; H04Q 7/20

(56) References Cited

U.S. PATENT DOCUMENTS

| 5,046,082 A | 9/1991 | Zicker et al. ............... 455/419 |
| 5,077,790 A | 12/1991 | D'Amico et al. | |

(Continued)

FOREIGN PATENT DOCUMENTS

| CA | 2234558 | 4/1997 |
| EP | 0 788 716 | 6/1997 |
| WO | WO 91/07856 | 5/1991 |
| WO | WO 95/15065 | 6/1995 |
| WO | WO 97/14258 | 4/1997 |
| WO | WO 97/22221 | 6/1997 |

OTHER PUBLICATIONS

Jim Carden, "Digital Opens the Door to Over–the–Air Activation," Cellular Business, The Journal of Cellular Telecommunications, pp. cover, 4, 50 & 52, Jan. 1994.

Sam Levenson & Karen Wong, "Rapid Service Activation for Personal Communications Access Services", pp. 1–5, IEEE 1994.

*Primary Examiner*—Young Lee
(74) *Attorney, Agent, or Firm*—Klarquist Sparkman, LLP

(57) ABSTRACT

A method and system automatically activates a mobile station in a wireless communications network. The system includes an over the air activation function (OTAF) processor in the network that initiates an activation process in response to receiving a registration message from a mobile switching center serving the mobile station requesting the activation. Each mobile station has a unit of information stored into it at the time of its manufacture to enable it to request over the air activation. That unit of information is either the network routing address of the OTAF processor, or alternately, it is a value that is translatable into that address, either an OTAF ID number that is the same value for every mobile station or it is a sequentially serialized dummy value for the mobile identification number (a dummy MIN). When the mobile station is turned on for the first time in the network, it requests activation over the air by transmitting to the local mobile switching center a registration order. The registration order will include one of the three alternative forms of the information unit described above, either the routing address of the OTAF processor, or the OTAF ID number, or a dummy MIN.

27 Claims, 7 Drawing Sheets

U.S. PATENT DOCUMENTS

| | | | |
|---|---|---|---|
| 5,109,403 A | 4/1992 | Sutphin | |
| 5,144,649 A | 9/1992 | Zicker et al. | 455/409 |
| 5,159,625 A | 10/1992 | Zicker | 455/432 |
| 5,247,160 A | 9/1993 | Zicker | 379/91.01 |
| 5,247,564 A | 9/1993 | Zicker | 379/40 |
| 5,257,412 A | 10/1993 | Tomioka et al. | |
| 5,297,191 A | 3/1994 | Gerszberg | |
| 5,297,192 A | 3/1994 | Gerszberg | |
| 5,301,223 A | 4/1994 | Amadon et al. | |
| 5,386,455 A | 1/1995 | Cooper | |
| 5,386,468 A | 1/1995 | Akiyama et al. | |
| 5,485,505 A | 1/1996 | Norman et al. | |
| 5,499,295 A | 3/1996 | Cooper | |
| 5,535,260 A | 7/1996 | Zicker et al. | 455/564 |
| 5,594,782 A | 1/1997 | Zicker et al. | |
| 5,603,084 A | 2/1997 | Henry, Jr. et al. | |
| 5,703,934 A | 12/1997 | Zicker et al. | 455/462 |
| 5,774,805 A | 6/1998 | Zicker | 455/426 |
| 5,787,354 A | 7/1998 | Gray et al. | 455/456 |
| 5,812,955 A | 9/1998 | Dent et al. | |
| 5,825,864 A | 10/1998 | McGraw et al. | |
| 5,826,191 A | 10/1998 | Krishnan | |
| 5,878,339 A | 3/1999 | Zicker et al. | |
| 5,887,259 A | 3/1999 | Zicker et al. | 455/434 |
| 5,960,340 A | 9/1999 | Fuentes | |
| 5,995,833 A | 11/1999 | Zicker | 455/430 |
| 6,038,437 A | 3/2000 | Zicker | 455/404 |
| 6,188,899 B1 | 2/2001 | Chatterjee et al. | |
| 6,282,421 B1 * | 8/2001 | Chatterjee et al. | 455/435 |

* cited by examiner

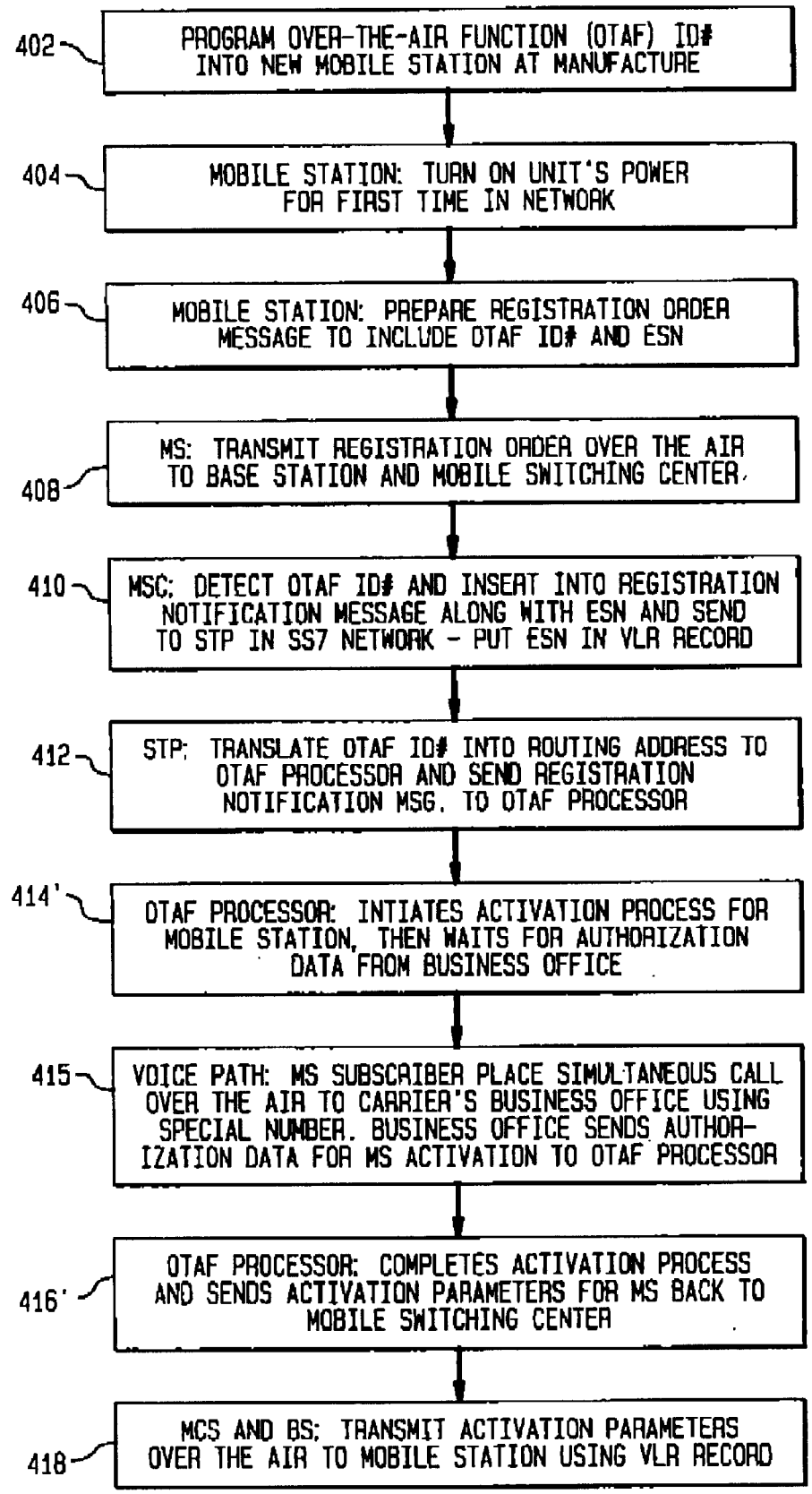

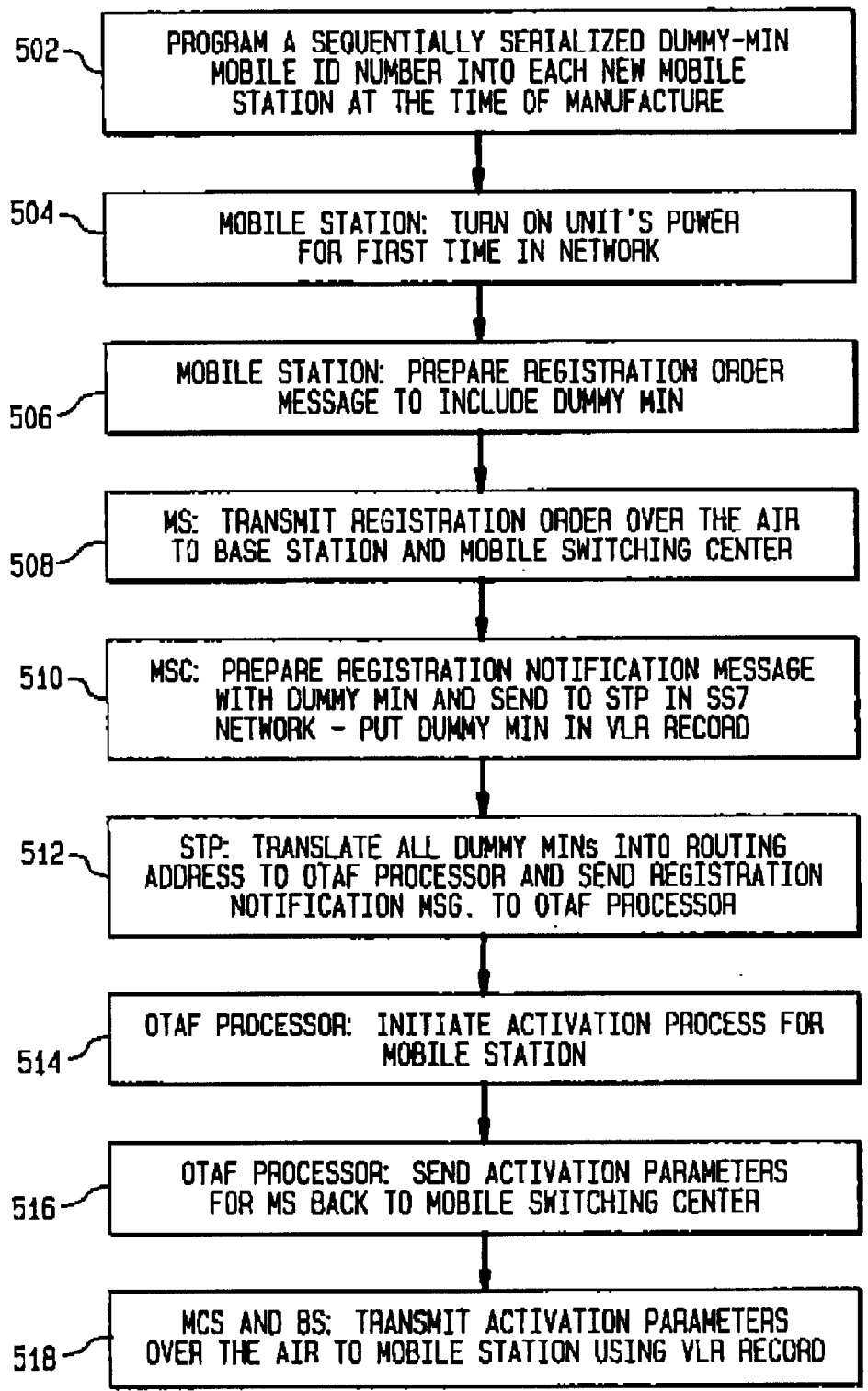

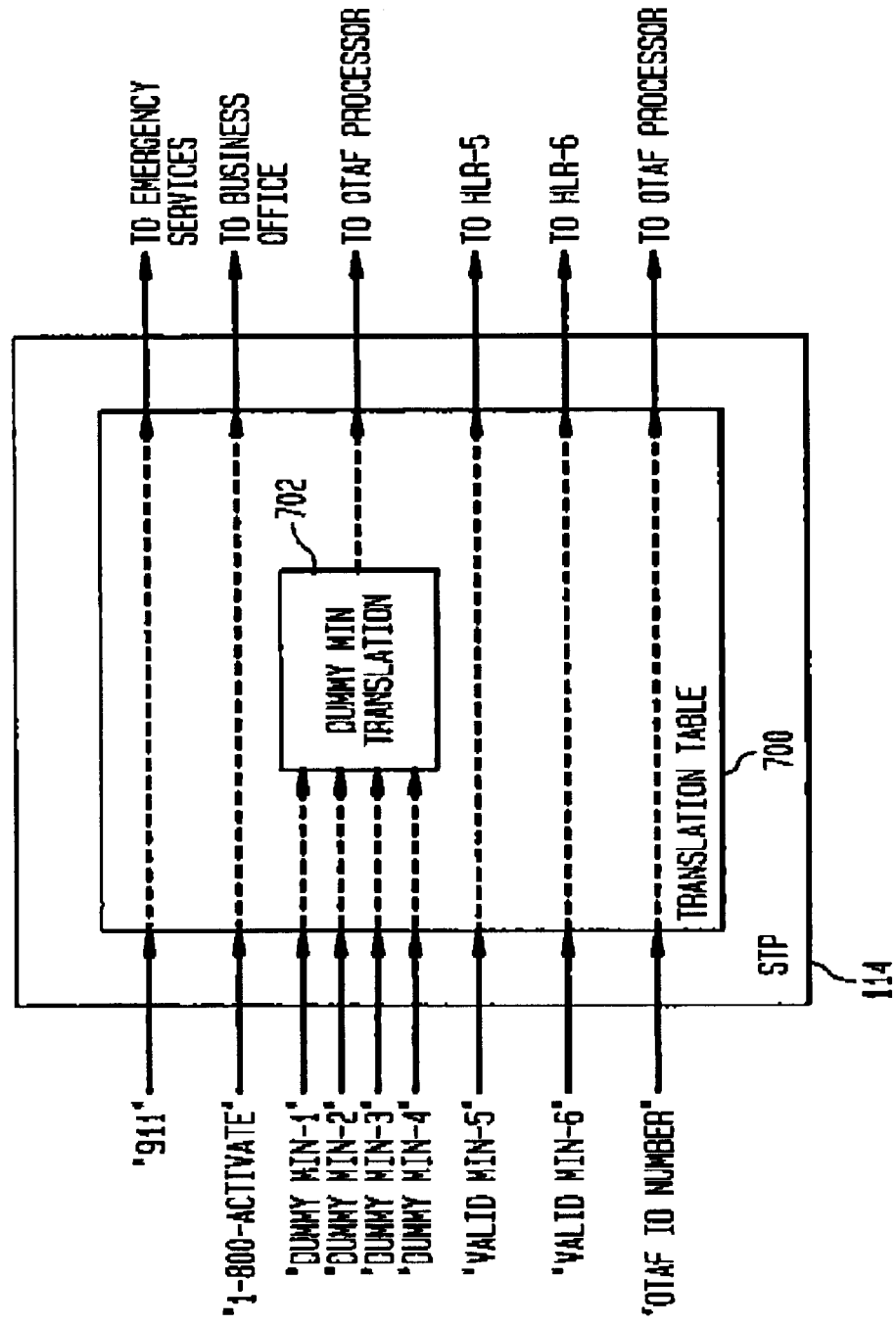

SYSTEM AND METHOD FOR AUTOMATIC REGISTRATION NOTIFICATION FOR OVER-THE-AIR ACTIVATION

This is continuation of co-pending application Ser. No. 09/702,163, filed Oct. 30, 2000, U.S. Pat. No. 6,282,421 which is a continuation of application Ser. No. 08/679,890, filed Jul. 15, 1996, now U.S. Pat. No. 6,188,899.

TECHNICAL FIELD

The invention broadly relates to over-the-air activation of mobile wireless telephones and more particularly relates to a method and apparatus for providing routing information to send a registration notification from a mobile switching center to an over-the-air activation processor in the fixed supporting network.

BACKGROUND OF THE INVENTION

The term "mobile station", as used herein, includes a comprehensive set of mobile telecommunications units that share the common property of communicating information with a base station in a network by means of electromagnetic waves. Mobile stations include mobile telephone devices such as mobile wireless telephone sets and cellular telephone sets that are primarily designed to exchange voice information with a base station. The term also includes mobile data communications devices such as pagers, mobile facsimile machines, and global positioning system (GPS) vehicle locator devices that are primarily designed to exchange data. The term "mobile station" also includes hybrid devices such as personal communications services (PCS) units, that have both telephony and facsimile communications features. Communications by mobile stations can be by radio waves, such as are used in cellular radio telephony. However, mobile stations can also communicate over electromagnetic links that include Earth-orbiting satellites, or alternate electromagnetic links that include optical or infra-red radiation.

Where the base station is connected in a fixed supporting network to other communications nodes, the network requires routing information for the mobile station to enable the other communications nodes to send information to the mobile station. Registration is the process used by a mobile station to announce its current location and to enable the fixed supporting network to direct incoming calls to the appropriate base station. When a mobile station is brought into the operating range of a new base station, the mobile station must announce its current location. In order to accomplish this, the mobile station must send a message with its mobile identity number (MIN) to the new base station. The MIN is a number assigned to the mobile station by the fixed supporting network to enable billing the customer for services and to enable the network to route incoming calls. The MIN must be programmed into the mobile station prior to the first time that the unit is used by the customer. This process is called activation.

For example, normally, a mobile wireless telephone set may not initiate or complete radio telephone calls until it is registered with and authorized for service by a service provider. Mobile wireless telephone service providers require that any new customer take the mobile wireless telephone set to an authorized service center for programming so that the telephone set becomes authorized for service in the network. Information must be entered and stored into the mobile wireless telephone set which is specific to the mobile subscriber and specific to the desired service for the set. In cellular mobile telephone communication services, for example, such information is referred to as number assignment module (NAM) designation parameters. Examples of NAM parameters that the cellular telephone service provider now manually enters into the cellular telephone set include system identification, telephone number, access overhead class, group identification, initial paging channel, security lock code, local use flag, A/B system selection, and MIN mark flag. The cellular telephone customer must present the new cellular telephone set to the service provider or a representative so that the NAM module, which constitutes approximately 30 bytes of information, can be manually entered into the cellular telephone set. There are millions of new customers each year for cellular mobile telephone communication services. Hundreds of employees of the service provider or representative, located over a wide geographic area, are responsible for manually entering the NAM module into unprogrammed cellular telephone sets for the new customers. This necessitates the use of a centraled data base to assist the service provider in coordinating the activation process. The service provider's employee typically uses a workstation computer to enter the customer's application data. The workstation is remotely connected to the central data base and sends the new customer's application data to the data base for processing. The centralized data base may perform a credit check on the new customer, may keep track of available services, telephone numbers, network access data, and other information, and then assigns the MIN to the new customer's cellular telephone set. The MIN and other NAM parameters are transmitted by the centralized data base back to the service provider's workstation for manual entry by the employee into the cellular telephone set. This presents a cumbersome and costly procedure both to the customer as well as to the service provider.

Thus, there exists a need for a method and system to automatically route activation information sent over-the-air from the mobile wireless telephone set, through the fixed supporting network to an over-the-air activation processor in the network, where the activation parameters for the NAM module can be prepared and automatically downloaded over the network and sent over-the-air to the mobile wireless cellular telephone set.

SUMMARY OF THE INVENTION

The need discussed above is satisfied by the invention, which enables an over-the-air activation message to be automatically sent from an unprogrammed mobile station to an over-the-air activation processor in the fixed supporting network. The activation message has the format of an ordinary registration message, but it is distinguished at the mobile switching center by including distinctive information that is translatable into the network address of the over-the-air activation processor. The electronic serial number of the mobile station is recorded in the visitor location register associated with the mobile switching center, and the activation message is directed by the mobile switching center to a signal transfer point in the fixed supporting network. The signal transfer point translates the distinctive information of the activation message into the network address of the processor. By contrast, ordinary registration messages would be directed by the mobile switching center to the home location register for the mobile station. From the signal transfer point, the activation message is routed, along with the identity of the mobile switching center, to the over-the-air activation processor. There the activation process is initiated in response to the received activation message. The over-the-air activation processor then transmits the activation parameters back to the mobile switching center, which then forwards them back to the mobile station, using the electronic serial number stored in the associated visitor location register.

In an advantageous embodiment of the invention, the distinctive information in the activation message is an over-the-air activation function ID number that is the same for every mobile station. The over-the-air activation function ID number is programmed into the mobile station at the time of its manufacture. During the translation by the signal transfer point, the single valued over-the-air activation function ID number is translated into the network address of the over-the-air activation processor. In an alternate embodiment of the invention, the distinctive information in the activation message is the routing address, itself, of the over-the-air activation processor.

In another alternate embodiment of the invention, the distinctive information in the activation message is a sequentially serialized dummy value for the mobile identification number, abbreviated as "dummy MIN." A dummy MIN is different for each mobile station. The dummy MIN is programmed into the mobile station at the time of its manufacture. During the translation by the signal transfer point, each distinctive dummy MIN is translated into the network address of the over-the-air activation processor. Since there is a small likelihood that a dummy MIN will be confused as a valid MIN by the signal transfer point, this embodiment is less advantageous than the embodiment where the distinctive information in the activation message is an over-the-air activation function ID number.

BRIEF DESCRIPTION OF THE DRAWINGS

Other features and advantages of the present invention will become apparent from the following detailed description taken together with the drawings in which:

FIG. 4B is a variation of the flow diagram of FIG. 4A, adding steps to provide a simultaneous voice path over-the-air to the carrier's business office.

FIG. 5 is a flow diagram of the method for an alternate embodiment of the invention where a sequentially serialized dummy MIN is used in the over-the-air activation process.

FIG. 7 is a schematic block diagram of a network signal transfer point, in accordance with the invention.

DETAILED DESCRIPTION

Figure 1:
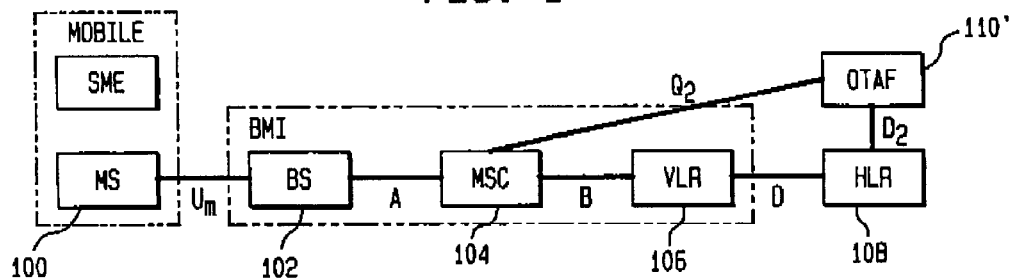
FIG. 1 illustrates a network reference model, in accordance with the invention.

The invention is a method and system for activating a mobile station in a wireless communications network. The system includes an over the air activation processor in the network that initiates an activation process in response to receiving a registration message from a mobile switching center serving the mobile station requesting the activation. This activation process is referred to herein as the "OTAF", which is an abbreviation for "over the air activation function."

Each mobile station has a unit of information stored into it at the time of its manufacture to enable it to request over the air activation. That unit of information is either the network routing address of the OTAF processor, or alternately, it is a value that is translatable into that address. There are two alternatives for expressing the value that is translatable into the routing address of the OTAF processor. The first alternative is an OTAF ID number that is stored in each mobile station. The same value of the OTAF ID number is stored in every mobile station. The second alternative is to store a sequentially serialized dummy value for the mobile identification number or dummy MIN. The dummy MIN is different for each mobile station.

When the mobile station is turned on for the first time in the network, it cannot conduct a normal communications session with other subscriber units because it has not been activated in the network. In accordance with the invention, the mobile station requests activation over the air by transmitting to the local mobile switching center a registration order. The registration order will include one of the three alternatives described above, either the routing address of the OTAF processor, or the OTAF ID number, or a dummy MIN.

The local mobile switching center receives registration orders from previously activated mobile stations, as well as from new mobile stations. If a previously activated mobile station is moved into the coverage area of a local mobile switching center, the mobile station must become registered in the new area before it can conduct normal communications sessions. A previously activated mobile station will have a valid MIN which it sends in the registration order transmitted to the local mobile switching center. The valid MIN is not distinguished by the mobile switching center from a dummy MIN. In both cases, the mobile switching center prepares a registration notification message containing the MIN and forwards it to the signal transfer point (STP) in the network.

In accordance with the invention, the translation tables in the signal transfer point (STP) are constructed to map all dummy MINs to the network routing address of the OTAF processor. There, the activation process is initiated for the requesting mobile station in response to the OTAF processor removing the registration notification message. A record is created in the visitor location register (VLR) at the mobile switching center, to enable the activation parameters resulting from the activation process to be sent back to the mobile station, using the dummy MIN value.

Instead, if the MIN in the registration notification message received by the signal transfer point (STP) is a valid MIN, the translation table maps the registration notification message to the network routing address of the home location register (HLR) that is responsible for handling the registration request from its assigned mobile station. This request is only programmed phone in the new local service area, not for the activation of a new phone.

Further in accordance with the invention, the mobile switching center is able to recognize and distinguish a registration order from a mobile station using the OTAF ID number to request activation. In this case, the mobile switching center inserts the OTAF ID number into the registration notification message it prepares for sending to the signal transfer point (STP). Since the OTAF ID number is the same for every mobile station, the electronic serial number (ESN) of the mobile station, that is sent with every registration order, is also included in the registration notification message sent to the signal transfer point. A record is created in the visitor location register (VLR) at the mobile switching center, to enable the activation parameters resulting from the activation process to be sent back to the mobile station using the ESN.

In accordance with the invention, the translation tables in the signal transfer point (STP) are constructed to map the OTAF ID number to the routing address of the OTAF processor. There, the activation process is initiated for the requesting mobile station in response to the OTAF processor receiving the registration notification message.

In an alternate embodiment of the invention, the unit of information stored in the mobile station at the time of its manufacture to enable it to request over the air activation is the network routing address, itself, of the OTAF processor. In this embodiment, there is no need for an address translation by the signal transfer point (STP). In this embodiment, the mobile switching center forwards the registration notification message directly to the OTAF processor. The identity of the mobile switching center and the ESN of the mobile station is included in the registration notification message. A record is created in the visitor location register (VLR) at the mobile switching center, to enable the activation parameters resulting from the activation process to be sent back to the mobile station using the ESN.

Further in accordance with the invention, the subscriber of the mobile station can place a simultaneous voice call to an activation center in the network using the mobile station. The subscriber can provide to the activation center credit information and the subscriber can specify the types of service features wanted for the mobile station. The activation center then sends authorization data to the OTAF processor in response to the information received from the subscriber over the voice channel. The OTAF processor can then complete the activation process in response to the authorization data.

Turning now to the figures, FIG. 1 shows a network reference model for the over-the-air activation function that controls delivery of the over-the-air activation messages to the mobile station. The mobile station 100 includes the mobile station (MS) and the short message entity (SME). The mobile station 100 communicates over-the-air with the base mobile station interworking function (BMI) which includes the base station BS 102, the mobile switching center MSC 104, and the visitor location register VLR 106. The base station, BS, is connected by means of the link A to the mobile switching center, MSC, which in turn is connected by means of the link B to the visitor location register, VLR. Also shown in FIG. 1 is the home location register, HLR 108, which is assigned to handle the maintenance of location and business records for the specific mobile telephone 100. The home location register 108 is typically located at a geographically remote location from the BMI currently servicing over-the-air communications with the mobile station 100. The HLR is connected by means of the link D to the VLR 106. Also shown in FIG. 1 is the over-the-air activation function OTAF 110' which is connected by means of a link Q2 to the mobile switching center 104 and is also connected by means of the link D2 to the home location register 108. The OTAF function 110' performs activation processing in response to a registration order from the mobile station 100 which has not previously been activated, and downloads activation parameters in the form of NAM parameters to the mobile station 100. The links A, B, D, D2, Q2, and UM shown in FIG. 1 are interfaces between network entities, as defined in the standard TIA IS-41, revision C ANSI ballot version, Jan. 3, 1996.

Figure 2:
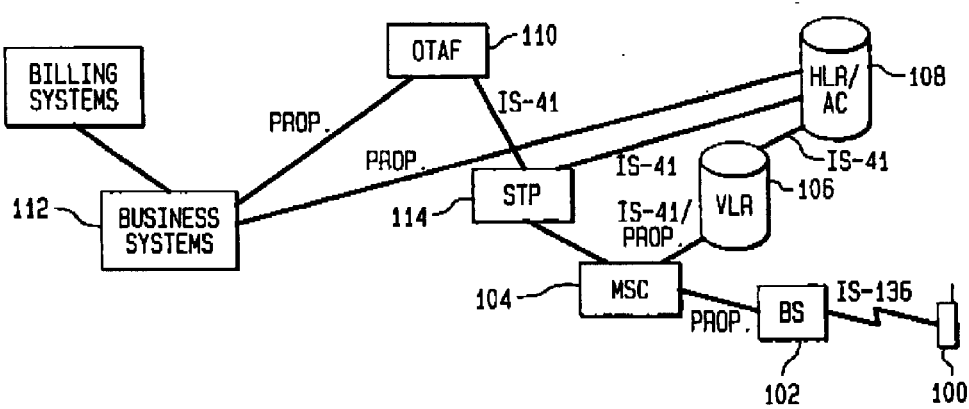
FIG. 2 illustrates the physical architecture of the over-the-air activation network.

FIG. 2 illustrates the over-the-air activation physical architecture. The mobile station 100 communicates over-the-air with the local base station 102, using the IS-136 standard. This standard is documented in TIA IS-136 Revision A, Mar. 21, 1996. The base station 102, the mobile switching center 104, and the visitor location register 106, are typically co-located at a local base station complex. The MSC 104 communicates over the fixed supporting network to the signal transfer point, STP 114, which in turn will forward messages from the MSC 104 to either the home location register, HLR 108, or alternately to the over-the-air activation function processor, OTAF processor 110. The VLR 106 at the base station complex can also directly access a particular HLR 108 in the fixed supporting network. Also shown in FIG. 2 is an activation center 112 which includes business systems and billing systems which are connected in the fixed supporting network to the OTAF processor 110 and to the HLR 108.

The over-the-air activation feature requires a notification be sent from the MSC 104 to the OTAF processor 110. This registration notification is via an IS-41 message on the Signaling System 7 (SS7) network. The fixed supporting network requires routing information to be able to send the registration notification from the MSC 104 to the proper network node, which in this case is the OTAF processor 110. In accordance with the invention, the mobile stations 100 are pre-programmed with information at the time of their manufacture to be able to request over-the-air activation. The unit of programmed information is either the network routing address of the OTAF processor 110 or alternately it is a value that is translatable into that address. When the unactivated mobile station 100 powers up in the network, the mobile station requests activation over-the-air by transmitting to the local mobile switching center 104 a registration order that includes one of the three alternatives for pre-programmed information, either the routing address of the OTAF processor 110, or the OTAF ID number, or a dummy MIN value. The MSC 104 then forwards this information through the network to the over-the-air activation function processor 110.

In a previously activated mobile station 100, that is a mobile station 100 that has been programmed with a valid mobile identification number MIN, the registration order transmitted over-the-air contains the mobile station's MIN, encoded in an IS-136 mobile station ID (MSID). (See the standard TIA IS-136 revision A, Mar. 21, 1996). The IS-136 standard specifies rules for encoding the MIN into the MSID. The MSID is sent in layer 2 of the registration order which is described in the IS-41 standard. Typically this operation takes place for a previously activated mobile station 100 which is moved into the coverage area of the local mobile switching center 104 and must become registered in the new area before it can conduct normal communication sessions. The registration notification is carried in the mobile application part (MAP) layer of the SS7 transport, as is specified in the IS-41 standard.

Cellular telephone networks use the global title translation (GTT) on the MIN at the signal transfer point 114 in a fixed supporting network, to route IS-41 messages to the home location register, HLR 108, in normal communications sessions. Global title translation (GTT) is described in the standard ANSI T1.112-1992, SS7, Signalling Connection Control Part (SCCP). The global title indicator type 2 is used, with a translation type value of 3 to specify the "MIN to HLR" translation in the STP 114. The global title address information field contains the ten digit MIN (BCD encoded). For Example, the MSC 104 and the VLR 106 will send the registration notification to the signal transfer point 114, which performs the GTT translation on the MIN to obtain routing information in the form of a point code and subsystem number in the fixed supporting network, to the HLR 108. Thus, in normal communications sessions, the registration notification is routed from the MSC 104 and VLR 106 to the HLR 108 which is responsible for the specified MIN from the requesting mobile station 100.

When a mobile station 100 has not previously been activated, the NAM parameters have not been loaded to the mobile station and there is no corresponding HLR record in any HLR 108 the fixed supporting network for that mobile station. The unactivated mobile station 100 does not have a valid MIN stored in it. If the unactivated mobile station attempts 100 registration, there is no corresponding HLR 108 associated with that mobile station. Since there is no valid MIN in the mobile station 100, the global title translation cannot be performed in the signal transfer point 114 in the fixed supporting network. This would normally prevent over-the-air activation since it would not be possible in the prior art to communicate over-the-air activation requests from the mobile station 100 to an OTAF processor 110 in the fixed supporting network. Corrrespondingly, it would not be possible to download NAM activation parameters from the OTAF processor 110 to the mobile station 100. During the over-the-air activation process, the OTAF processor 110 must deliver the NAM parameters to the mobile station 100. In order to do this, the over-the-air activation function processor 110 must have an address of the serving MSC 104 plus the mobile station must have registration information in the VLR 106 of the serving MSC 104. In accordance with the invention, mobile stations 100 will be programmed with information at the time of their manufacture to enable them to request over-the-air activation. That unit of information is either the network routing address of the OTAF processor 110, or alternatively it is a value that is translatable into that address. There are two alternatives for expressing the value that is translatable into the routing address to the OTAF processor 110, the first being an OTAF ID number that is stored in each mobile station 100. The same vlue of the OTAF ID number is stored in every mobile station 100. The second alternative is to store a sequentially serialized dummy value for the mobile identification number, called a dummy MIN. The dummy MIN is different for each mobile station 100.

In the advantageous embodiment of the invention, an OTAF ID number is stored in each mobile station 100. The OTAF ID number is a ten digit B. 164 telephony number, using BCD encoding. The format follows standard IS-41 digit encoding (such as used in the IS-41 Sender Identification Number). This standard format is described further in the CCITT Blue Book, Volume II—Fascicle II.2, Telephone Network and ISDN—Operation Numbering, Routing and Mobile Service, Recommendation E.164; Numbering Plan for the ISDN Era. The OTAF ID number is an address which appears as a directory number for the OTAF processor 110, but is used only for routing and is a non-dialable number not supporting voice circuits. The registration order in the IS-136 standard is modified to carry the OTAF ID number in the air interface message. In addition, the mobile station 100 must supply an MSID value in the message to uniquely identify the mobile station sending the message. This MSID value is constructed using the electronic serial number (ESN) of the mobile station 100, as is specified in the IS-136 standard. This standard specifies how an MSID is to be constructed if a mobile station does not have a valid MIN.

Upon receipt of the air interface registration order, the MSC 104 and VLR 106 construct an IS-41 registration notification message using the information supplied in the air interface registration order from the mobile station 100. The MSC 104 recognizes that the mobile station 100 supplied an OTAF ID number, and thus the MIN field is not populated in the registration notification message. The OTAF ID number is included in the Signaling Connection Control Part (SCCP) layer of the mobile application part (MAP) of the IS-41 message. The SCCP layer is described in the published standard ANSI T1.112 Signalling System No. 7 (SS7)—Signalling Connection Control Point (SCCP). The MSC 104 and VLR 106 then send the registration notification message to the signal transfer point 114 in the fixed supporting network. The VLR 106 also creates a record of the mobile station 100 using the ESN and the MSID for the mobile station 100.

The STP 114 receives the registration notification message and recognizes that it is to perform the global title translation (GTT) on the OTAF ID number, in order to get the fixed supporting network address of the OTAF processor 110. A new translation type has to be used for the "OTAF ID number to OTAF processor" translation. The STP 114 translates the OTAF ID number into the routing address information (PC/SSN) for the OTAF processor 110 in the fixed supporting network, and a registration notification message is forwarded to the OTAF processor 110.

This routing mechanism, in accordance with the invention, allows for routing a registration notification message without the need to have a mobile identification number MIN preprogrammed into the mobile station 100.

Figure 3:
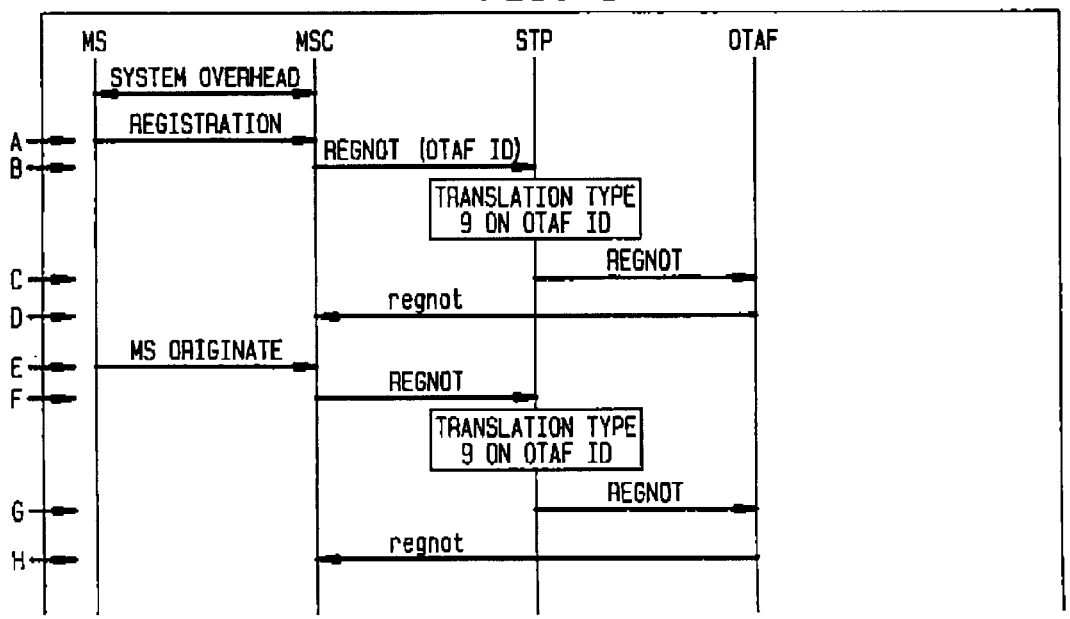
FIG. 3 illustrates the information flow for over-the-air activation registration, in accordance with the invention.

The information flow diagram of FIG. 3 illustrates the over-the-air activation registration flow for activation registration using the global title translation on the OTAF ID number. The figure is organized with the vertical axis representing time and the horizontal axis representing messages passing between the mobile station 100 (labeled MS), the mobile switching center 104 (labeled MSC), the signal transfer point 114 (labeled STP), and the OTAF processor 110 (labeled OTAF). When a subscriber powers up a mobile station MS, the mobile station engages in an acquisition phase to obtain a channel assignment from the base station, which is identified in the FIG. 3 as system overhead. Then the mobile station MS sends an IS-136 registration order (message A) to the MSC 104 containing the OTAF ID number (designated OTAF ID in FIG. 3).

Then the MSC 104 receives the registration order (message A) from the air interface and it formats an IS-41 registration notification (message B) identified as "REG-NOT" in FIG. 3. The MSC 104 sends the REGNOT to the STP 114 for routing.

Then the STP 114 performs a global title translation on the OTAF ID number (OTAF ID) and routes the REGNOT (message C) to the OTAF processor 110.

The OTAF processor 110 processes the REGNOT and returns a REGNOT return result (message D) to the MSC 104.

FIG. 3 also shows an MS originate attempt where the mobile station MS attempts to originate a voice connection to the fixed supporting network. The simultaneous voice origination attempt and registration order will take place in the four step sequence of messages E, F, G, and H shown in FIG. 3, which is the same as the four step sequence of messages A, B, C, and D previously described for FIG. 3.

Figure 4A:
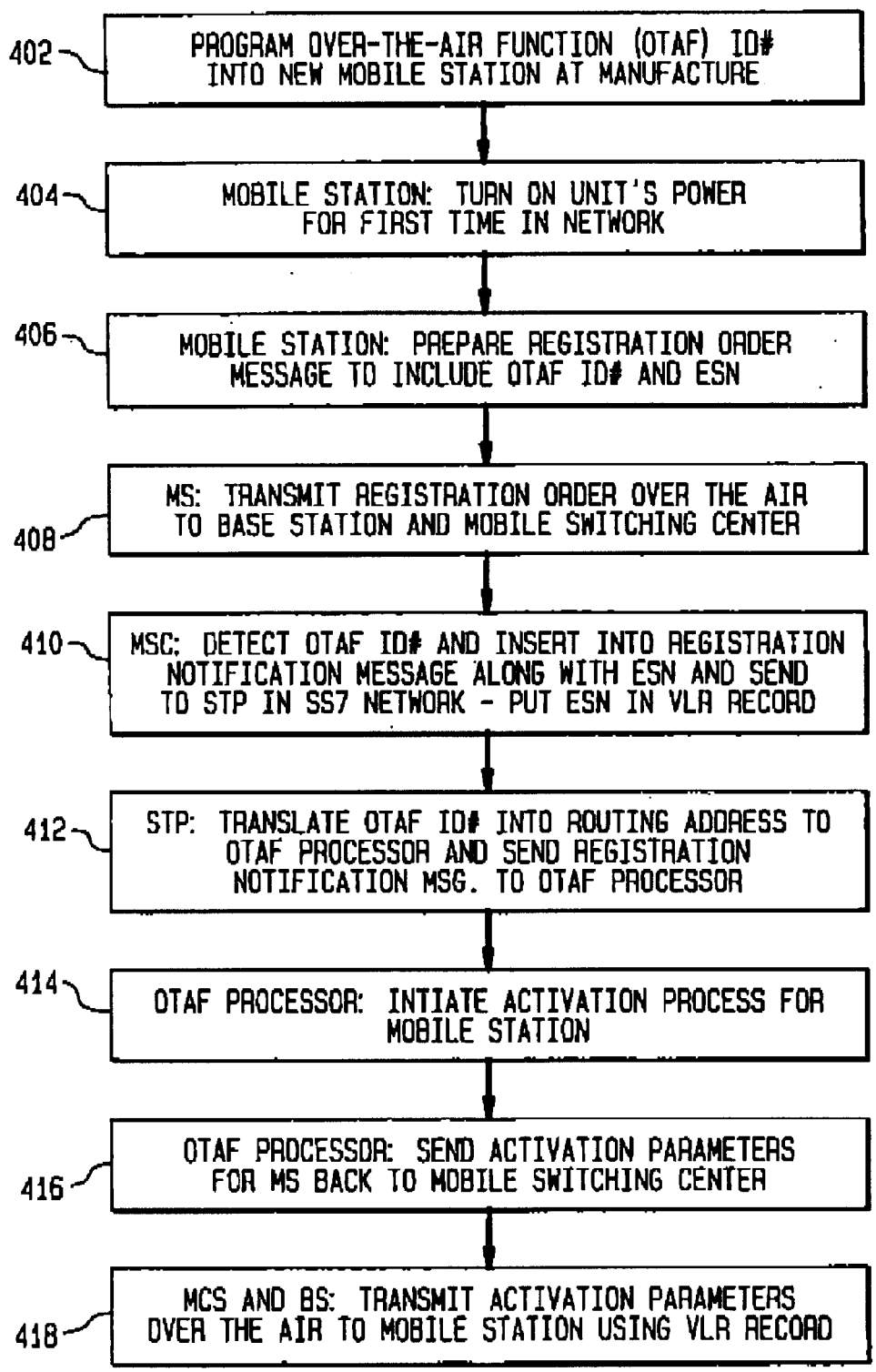
FIG. 4A is a flow diagram of the method for an advantageous embodiment of the invention for over-the-air activation using the OTAF ID number.

FIG. 4A illustrates a flow diagram of a sequence of operational steps for carrying out over-the-air activation using an OTAF ID number. Step 402 begins by programming the over-the-air function ID number into a new mobile station 100 at the time of manufacture.

Step 404 in FIG. 4A has the mobile station 100 turn on the unit's power for the first time in the network. Then in step 406, mobile station 100 prepares the registration order message to include the OTAF ID number and the ESN. Then in step 408, the mobile station 100 transmits station 100 a registration order over-the-air to the base station and the mobile switching center.

In step 410 of FIG. 4A, the mobile switching center 104 detects the OTAF ID number and inserts it into the registration notification message along with the ESN, which it then sends to the STP 114 in the SS7 network. The MSC 104 also puts the ESN into a VLR record in the VLR 106.

Then step 412 of FIG. 4A has the STP 114 translate the OTAF ID number into a routing address to the OTAF processor 110. The STP sends the registration notification message to the OTAF processor 110 in the network.

In step 414 of FIG. 4A has the OTAF processor 110 initiate the activation process for the mobile station 100. In step 416, the OTAF processor 110 sends the activation parameters in the form of the NAM parameters, for the mobile station, back to the mobile switching center 104.

Then step 418 of FIG. 4A has the mobile switching center 104 and base station 102 transmit the activation parameters over-the-air to the mobile station 100 using the VLR record in the VLR 106 to identify which mobile station 100 is intended to receive the activation parameters.

FIG. 4B illustrates a flow diagram of a variation in the method shown in FIG. 4A, wherein step 414' has the OTAF processor 110 initiate the activation process for the mobile station 100 and then wait for authorization from the business office activation center 112, shown in FIG. 2.

Step 415 of FIG. 4B has a voice path established over-the-air by the mobile station subscriber. The mobile station subscriber places a simultaneous call over-the-air to the carrier's business office activation center 112, using a special dialed number such as "1-800-ACTIVATE". The subscriber can provide to the business office activation center 112 credit information and the subscriber can specify the types of service features wanted for the mobile service. The business office activation center 112 then sends authorization data to the OTAF processor 110.

Step 416' of FIG. 4B then has the OTAF processor 110 complete the activation process and send the activation parameters for the mobile station back to the mobile switching center 104. Then step 418 of FIG. 4B has the mobile switching center 104 and base station 102 transmit the activation parameters over-the-air to the mobile station 100.

FIG. 5 illustrates a flow diagram of a sequence of operational steps for an alternate embodiment of the invention, wherein each new mobile station 100 is programmed at the time of manufacture with a sequentially serialized dummy MIN mobile ID number. This is shown in step 502 of FIG. 5. Step 504 has the mobile station 100 turn on the unit's power for the first time in the network. Step 506 has a mobile station 100 prepare a registration message to include the dummy MIN. Step 508 has the mobile station 100 transmit the registration order over-the-air to the base station and the mobile switching center 104.

Step 510 of FIG. 5 has the MSC 104 prepare registration notification message with the dummy MIN. This operation is the same as if the mobile station 100 were requesting a normal registration for a previously activated mobile station, the mobile switching center 104 being unable to distinguish between a dummy MIN and a valid MIN. The mobile switching center 104 then sends the registration notification message to the STP 114 in the SS7 network. The MSC 104 puts the dummy MIN into a VLR record in the VLR 106. In step 512, the STP 114 translates all dummy MINs into the routing address of the OTAF processor 110. All of the plurality of sequentially serialized dummy MIN values are translated by the STP 114 into a single OTAF processor address in the fixed supporting network. Then the STP 114 sends the registration notification message to the OTAF processor 110.

Then step 514 of FIG. 5 has the OTAF processor 110 initiate the activation process for the mobile station 100. In step 516, the OTAF processor 110 sends the activation parameters for the mobile station back to the MSC 104.

Then in step 518 of FIG. 5, the MSC 104 and base station 102 transmit the activation parameters over-the-air to the mobile station 100 using the VLR record in VLR 106 to identify with the dummy MIN which mobile station 100 is the intended recipient for the activation parameters.

Figure 6:
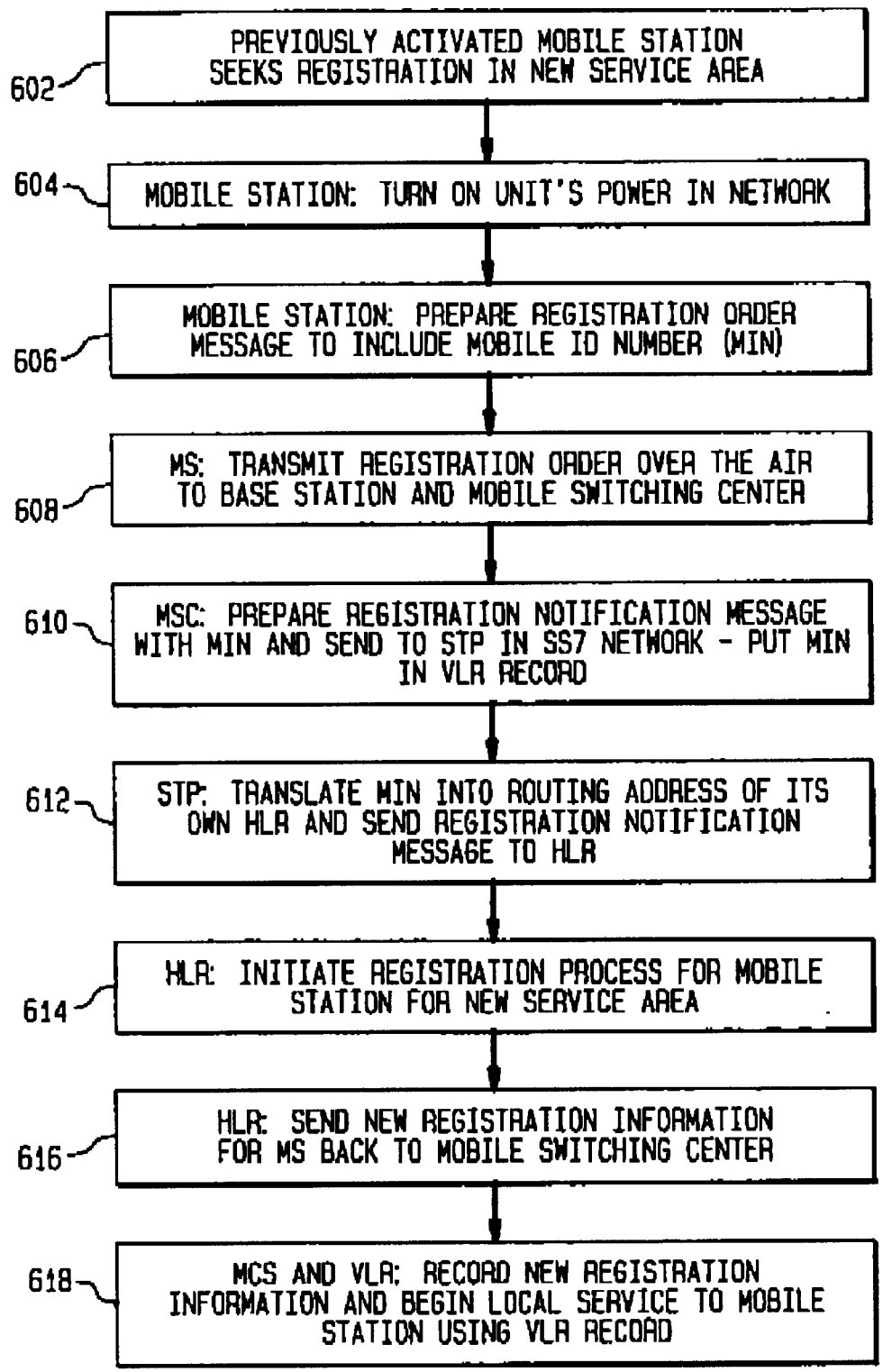
FIG. 6 is a flow diagram illustrating the method of the invention for a previously activated mobile station which seeks registration in a new service area.

FIG. 6 is flow diagram of the sequence of operational steps for a previously activated mobile station 100 having a valid MIN, which seeks registration in a new service area.

In step 602, the previously activated mobile station 100 seeks registration in the new services area. In step 604, the mobile station 100 turns on the unit's power in the network. In step 606 the mobile station 100 prepares a registration order message to include the valid mobile identification number (MIN). In step 608, the mobile station 100 transmits the registration order over-the-air to the base station 102 and MSC 104. In step 610, the MSC 104 prepares the registration notification message with the valid MIN and sends it to the STP 114 in the SS7 network. The MSC also puts the valid MIN in a VLR record in VLR 106. In step 612, the STP 114 translates the valid MIN into the routing address of the HLR 108 assigned to the mobile station 100. The STP 114 sends the registration notification message to the HLR 108. In step 614, the HLR 108 initiates the registration process for the mobile station for the new service area. In step 616, the HLR 108 sends the new registration information for MS 100 back to the MSC 104. In step 618, the VLR 106 updates the new registration information and begins local service to the mobile station 100 using the VLR record.

FIG. 7 illustrates the STP 114 and its translation table 700 and shows how a plurality of dummy MINs having different, sequentially serialized values, are translated in translation 702 into a single OTAF address. FIG. 7 shows several example translations of input expressions in the dialed number format to output Signaling System 7 (SS7) network addresses. For example, the dialed number "911" input to the translation table 700, is translated into the SS7 network address of emergency services. As another example, the dialed number "1-800-ACTIVATE" input to the translation table 700, is translated into the SS7 network address of the business office activation center 112 shown in FIG. 2. As another example, the dialed number format for the valid MIN "VALID MIN-5" input to the translation table 700, is translated into the SS7 network address of the HLR-5 home location register for that MIN. As another example, the dialed number format for the valid MIN "VALID MIN-6" input to the translation table 700, is translated into the SS7 network address of the different HLR-6 home location register for that different valid MIN. In accordance with the invention, all of the dummy MINs are translated by the translation 702 in the translation table 700 into the network address of the OTAF processor 110. Still further in accordance with the invention, the OTAF ID number is translated by the translation table 700 into the SS7 network address of the OTAF processor 110.

Figure 8A:
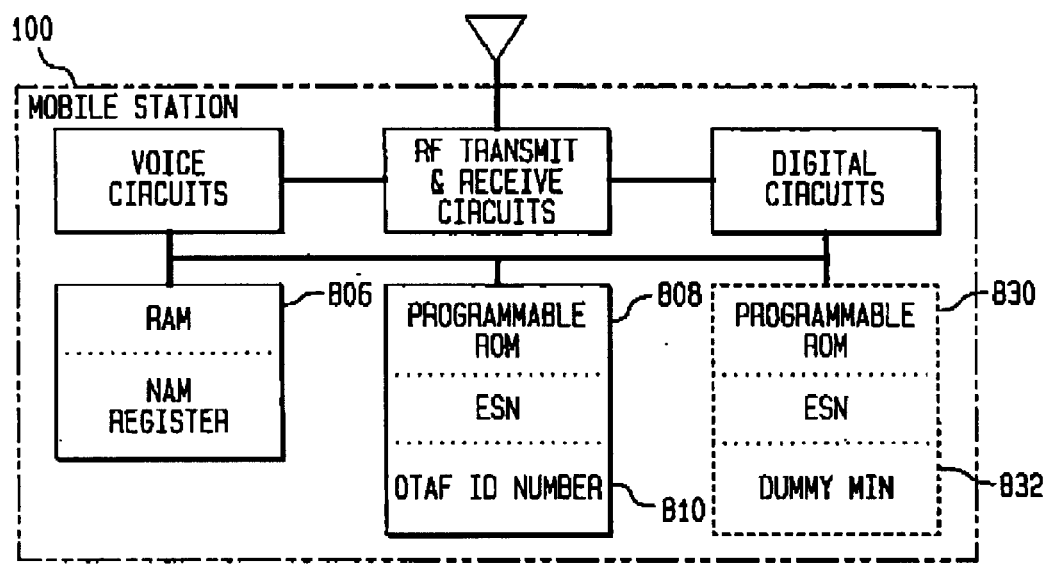
FIG. 8A is a functional block diagram of a mobile station.

FIG. 8A shows a schematic diagram of a mobile station 100 with a preprogrammed OTAF ID number 810 or alternately with a pre-programmed dummy MIN 832. Mobile station 100 includes RF transmit and receive circuits, digital circuits, and voice circuits. Mobile station 100 also includes the RAM memory 806 which stores the NAM parameters in the NAM register after they are downloaded over the air from the OTAF processor 110. Mobile station 100 also includes the programmable read only memory (ROM) 808 that is programmed at the time of manufacture with the ESN and with the OTAF ID number 810. In the alternate embodiment of the invention, mobile station 100 alternately includes the programmable ROM 830 (shown in dotted outline in FIG. 8A) that is programmed at the time of manufacture with the ESN and with a sequentially serialized dummy MIN 832.

Figure 8B:
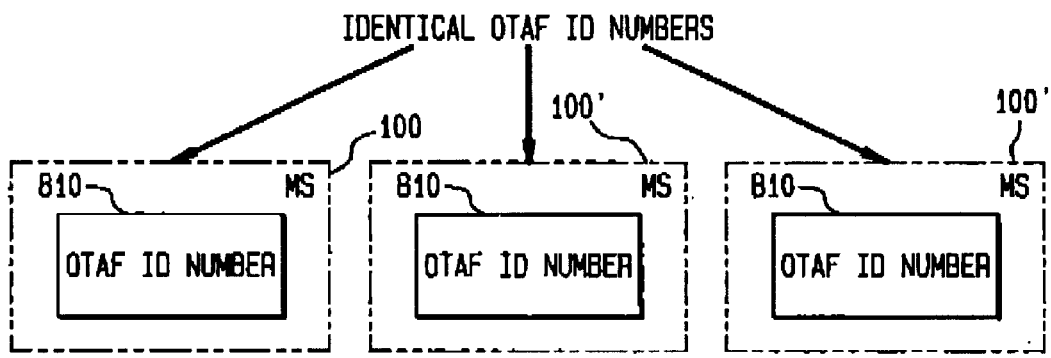
FIG. 8B illustrates plurality of mobile stations, each with the same OTAF ID number store therein.

FIG. 8B shows how a plurality of mobile stations 100, 100', and 100" are all preprogrammed with the identical OTAF ID number 810, in the advantageous embodiment.

Figure 8C:
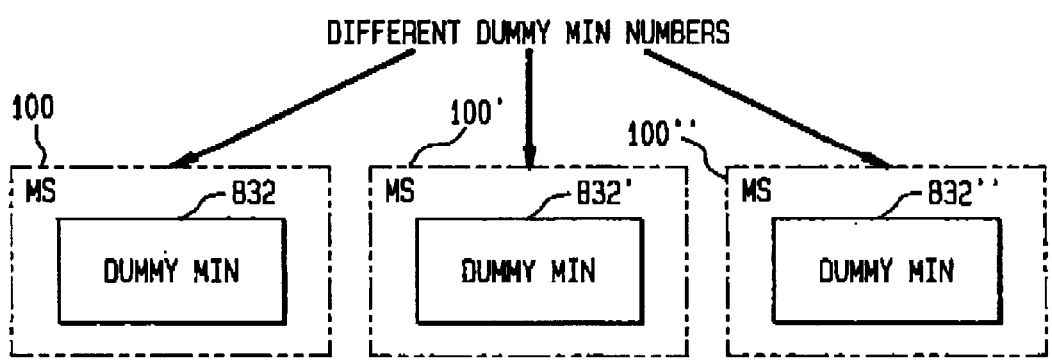
FIG. 8C illustrates plurality of mobile stations, each with a different dummy MIN stored therein.

FIG. 8C shows how a plurality of mobile stations 100, 100', and 100" in the alternate embodiment, are preprogrammed with mutually different dummy MIN values 832, 832', and 832".

What is claimed is:

1. A method for activating a mobile station in a wireless communications network, the method comprising:
   receiving at a network node a registration message including distinctive information, wherein the registration message has a format of an ordinary registration message used in a registration process, wherein the registration process is operable to determine the location of the mobile station and enable the wireless communications network to direct incoming calls to an appropriate base station;
   processing the registration message as an over-the-air activation message based on inclusion of the distinctive information, wherein the distinctive information comprises at least one of the following: a dummy MIN, an address of an over-the-air activation processor, and an over-the-air activation function ID number;
   routing notification of the registration message to the over-the-air activation processor;
   initiating an activation process at the over-the-air activation processor in response to the received registration message notification; and
   transmitting activation parameters to the mobile station in response to the activation process.

2. The method of claim 1 wherein the processing is performed at least in part at a mobile switching center.

3. The method of claim 1 wherein the distinctive information comprises the dummy MIN, the method further comprising:
   translating the dummy MIN into an address for the over-the-air activation processor.

4. The method of claim 1 wherein the distinctive information comprises the over-the-air activation function ID number, the method further comprising:
   translating the over-the-air activation function ID number into an address for the over-the-air activation processor.

5. The method of claim 1 wherein
   the distinctive information comprises the over-the-air activation function ID number; and
   the ID number is a non-dialable number not supporting voice circuits.

6. The method of claim 1 wherein
   the distinctive information comprises the address of an over-the-air activation processor; and
   the address is a non-dialable number not supporting voice circuits.

7. The method of claim 1 further comprising:
   storing at least portions of the mobile station's serial number in a visitor location register as a portion of a record associated with the mobile station;
   wherein transmitting activation parameters to the mobile station is performed via the record associated with the mobile station.

8. The method of claim 1 wherein
   the distinctive information comprises the address of the over-the-air activation processor; and
   the network node receives a plurality of registrations messages from a plurality of mobile stations, the registration messages including a non-unique mobile station identifier.

9. The method of claim 1 wherein the address of the over-the-air activation processor is an SS7 network address.

10. A method for activating a mobile station in a wireless communications network, the method comprising:
    receiving at a network node a registration message including an address of an over-the-air activation processor and at least a portion of an ESN, wherein the registration message has a format of a standard registration message used in a registration process;
    storing the at least a portion of an ESN in a visitor location register as at least a portion of a visitor record;
    processing the registration message based on inclusion of the address of the over-the-air activation processor;
    routing notification of the registration message to the over-the-air activation processor having the address included in the message;
    initiating an activation process at the over-the-air activation processor in response to the received notification of the registration message; and
    transmitting activation parameters to the mobile station in response to the activation process via the visitor record;
    wherein activation is accomplished without the mobile station having a valid MIN.

11. A method of providing over-the-air activation for a mobile device, the method comprising:
    pre-programming the mobile device with distinctive information comprising at least one of the following: a dummy MIN, an address of an over-the-air activation processor, and an over-the-air activation function ID number;
    sending the distinctive information from the mobile device via a registration messages wherein the registration message has a standard format used in a registration process, wherein the registration process is operable to determine the location of the mobile station and enable the wireless communications network to direct incoming calls to an appropriate base station; and
    activating the mobile device over the air via the distinctive information.

12. The method of claim 11 wherein over-the-air activation is achieved over an SS7 network.

13. The method of claim 11 wherein the activating comprises transmitting activation parameters to a mobile device without a valid MIN.

14. A network node operable to receive a registration message from an unactivated mobile station, the network node comprising:

means for mapping an over-the-air activation function ID number associated with the registration message from the unactivated mobile station to an address of an over-the-air activation processor; and means for directing the registration message from the unactivated mobile station to the address of the over-the-air activation processor to thereby facilitate activation of the unactivated mobile station;

wherein the means for mapping is operable to map data associated with a registration message for an activated mobile station during a registration process to achieve registration of the activated mobile station.

15. The network node of claim 14 wherein the address is an SS7 network address.

16. The network node of claim 14 wherein the means for mapping is further operable to map an activation phone number to a network address of a business office activation center.

17. A network node operable to receive a registration message from a an unactivated mobile station, the network node comprising:

means for mapping a dummy MIN to an address of an over-the-air activation processor; and means for directing notification of the registration message to the address of the over-the-air activation processor to thereby facilitate activation of the unactivated mobile station;

wherein the means for mapping the dummy MIN is further operable to map a valid MIN of an activated mobile station to achieve registration of the activated mobile station.

18. The network node of claim 17 wherein the address is an SS7 network address.

19. The network node of claim 17 wherein the means for mapping is operable to map plural dummy MINs to a same address.

20. The network node of claim 17 wherein the means for mapping is further operable to map an activation phone number to a network address of a business office activation center.

21. A mobile device operable to be activated over the air, the mobile device comprising:

pre-programmed distinctive information comprising at least one of the following: a dummy MIN, an address of an over-the-air activation processor, and an over-the-air activation function ID number; and means for communicating the distinctive information over the air via a registration message to acquire activation parameters;

wherein the means for communicating is further operable to communicate information over the air via a registration message to achieve registration of the mobile device.

22. A mobile device operable to be activated over the air, the mobile device comprising:

an antenna;

transmit and receive circuits couple to the antenna;

digital circuits coupled to the transmit and receive circuits;

memory coupled to the digital circuits, the memory pre-programmed with a unit of information and instructions to enable the digital circuits to perform over-the-air activation with a wireless communication network;

the unit of information comprising at least one of the following: an address of an over-the-air activation processor and information translatable to an address of an over-the-air activation processor; and the instructions comprising: transmitting the unit of information to the wireless communication network via a registration message, receiving activation parameters from the wireless network in response to the transmission, and storing the activation parameters in the memory;

wherein the registration message is of a format of that used in a registration process, wherein the registration process is operable to determine the location of the mobile station and enable the wireless communications network to direct incoming calls to an appropriate base station.

23. The mobile device of claim 22 wherein the information translatable to an address of an over-the-air activation processor comprises an over-the-air activation function ID number.

24. The mobile device of claim 22 wherein the information translatable to an address of an over-the-air activation processor comprises a dummy MIN.

25. The mobile device of claim 22 wherein the instructions further comprise transmitting a registration order to the wireless communication network.

26. The mobile device of claim 22 wherein the activation parameters comprise at least one NAM parameter.

27. The mobile device of claim 22 wherein the activation parameters comprise a valid MIN.

* * * * *

UNITED STATES PATENT AND TRADEMARK OFFICE
CERTIFICATE OF CORRECTION

PATENT NO. : 6,915,132 B1
DATED : July 5, 2005
INVENTOR(S) : Chatterjee et al.

It is certified that error appears in the above-identified patent and that said Letters Patent is hereby corrected as shown below:

Column 3,
Line 61, "store" should read -- stored --.

Column 4,
Lines 62-63, "This request is only programmed" should read -- This request is only for the registration of a previously programmed --.

Column 7,
Line 39, "programmed" should read -- pre-programmed --.
Line 47, "vlue" should read -- value --.
Line 55, "digit B" should read -- digit E --.

Column 9,
Line 27, "4a has the" should read -- 4a, the --.
Line 28, "initiate" should read -- initiates --.
Line 66, "registration message" should read -- registration order message --.

Column 10,
Line 28, "FIG. 6 is flow" should read -- FIG. 6 is a flow --.

Column 12,
Line 60, "messages" should read -- message, --.

Column 14,
Line 14, "couple" should read -- coupled --.

Signed and Sealed this

Fifteenth Day of November, 2005

JON W. DUDAS
*Director of the United States Patent and Trademark Office*